(12) United States Patent
Bayer

(10) Patent No.: US 7,056,481 B2
(45) Date of Patent: Jun. 6, 2006

(54) AGENT AND METHOD FOR REMOVING POLLUTANTS FROM GASES

(75) Inventor: Michael Bayer, Thierhaupten (DE)

(73) Assignee: Clariant GmbH, Frankfurt (DE)

( * ) Notice: Subject to any disclaimer, the term of this patent is extended or adjusted under 35 U.S.C. 154(b) by 730 days.

(21) Appl. No.: 10/220,774

(22) PCT Filed: Feb. 20, 2001

(86) PCT No.: PCT/EP01/01897

§ 371 (c)(1),
(2), (4) Date: Sep. 5, 2002

(87) PCT Pub. No.: WO01/66228

PCT Pub. Date: Sep. 13, 2001

(65) Prior Publication Data

US 2003/0075076 A1 Apr. 24, 2003

(30) Foreign Application Priority Data

Mar. 7, 2000 (DE) .......................................... 100 11 031
Sep. 18, 2000 (DE) .......................................... 100 46 015
Nov. 9, 2000 (DE) .......................................... 100 55 515

(51) Int. Cl.
*B01J 8/00* (2006.01)

(52) U.S. Cl. ....................... 423/210; 502/401; 502/402; 524/763; 422/168

(58) Field of Classification Search ................. 502/400, 502/401; 524/19, 277, 480, 487, 490, 763; 423/210; 422/168
See application file for complete search history.

(56) References Cited

U.S. PATENT DOCUMENTS

| | | | |
|---|---|---|---|
| 4,200,609 A | 4/1980 | Byrd | 422/122 |
| 4,316,730 A | 2/1982 | Eibl | 55/524 |
| 4,339,250 A | 7/1982 | Thut | 55/316 |
| 4,896,683 A | 1/1990 | Cohen et al. | 131/342 |
| 5,087,273 A | 2/1992 | Ward | 55/279 |

FOREIGN PATENT DOCUMENTS

| | | |
|---|---|---|
| GB | 906 924 | 9/1962 |
| GB | 2 004 729 | 4/1979 |
| WO | WO 99/02257 | 1/1999 |

*Primary Examiner*—Edward M. Johnson
(74) *Attorney, Agent, or Firm*—Anthony A. Bisulca

(57) ABSTRACT

The present invention relates to an agent for removing pollutants from gases comprising a wax which has a drop melting point between 40 and 150° C., a melt viscosity of 2 to 20 000 mPas and a needle penetration of 1 to 50, and which contains at least one alkoxylated compound.

13 Claims, No Drawings

AGENT AND METHOD FOR REMOVING POLLUTANTS FROM GASES

The present invention relates to an agent and a process for removing pollutants from gases, comprising waxes which contain alkoxylated compounds.

In closed rooms, air pollution with nicotine and volatile combustion products resulting from the consumption of tobacco can be so high that hazards to the health of persons situated in the room for a relatively long time cannot be excluded.

Another health hazard occurs under summer weather conditions, particularly in an urban region, where, owing to a comparatively high nitrogen oxide concentration, the ozone concentration can become so high that motor vehicle traffic has to be forbidden and humans suffer from corresponding problems due to the ozone.

In order to remove pollutants from gases, filter systems which operate chemically or physically are produced which are used not only in the building air conditioning sector, but also for air conditioning passenger cabins of modern motor transport (buses, railways, trucks, cars, airplanes).

According to U.S. Pat. No. 4,339,250, prior art is removing particles by means of electrostatic high-voltage cells. Nicotine and odor substances are bound to activated carbon surfaces. It is also possible to bind nicotine, according to U.S. Pat. No. 4,896,683, on the surfaces of water-soluble salts which are situated on cellulose fibers.

Eliminating odors using fragrance substances released from suitable equipment is disclosed in U.S. Pat. No. 5,087,273.

The removal of ozone from air by means of manganese oxide or cerium oxide which is situated on a substrate and was produced from soluble salts of manganese or cerium is proposed in U.S. Pat. No. 4,200,609.

However, it has been found that said filters, after a single use, can no longer be regenerated, but must be disposed of as refuse.

Furthermore, the efficiency of the described filters is very limited in time, so that the filter must be changed very early. The described adsorbents are, in addition, only suitable for binding in each case one of said pollutants.

It was therefore an object of the present invention to provide an agent which is suitable for gas purification and does not have said disadvantages.

Surprisingly, it has been found that waxes which contain alkylene oxide adducts are particularly highly suitable as an adsorbent for pollutants such as nicotine, formaldehyde and ozone from gases. It has also been found that waxes, in a mixture with alkylene oxide copolymers, or alternatively with alcohols, are suitable for binding odor substances from gases. It has also been found that adsorbers produced containing the alkoxylated wax may be regenerated and the amount of adsorber waste is decreased.

The present invention thus relates to an agent for removing pollutants from gases comprising a wax which has a drop melting point between 40 and 150° C., a melt viscosity of 2 to 20 000 mPas and a needle penetration of 1 to 50 and which contains at least one alkoxylated compound.

The drop melting point is determined in accordance with DIN 51801, Edition 1980-12, the melt viscosity in accordance with DIN 53018-1 and -2, Edition 1976-03 and the needle penetration in accordance with DIN 51579, Edition 1965-05.

The present invention further relates to a wax which has a drop melting point between 40 and 150° C., a melt viscosity of 2 to 20 000 mPas and a needle penetration of 1 to 50 containing a) 0.5 to 99.5% by weight, preferably 10 to 90% by weight, of an alkoxylated montan acid,
b) 0.5 to 99.5% by weight, preferably 10 to 90% by weight, of an alkoxylate of an unbranched or branched, monohydric or polyhydric alcohol having 20 to 40 carbon atoms.

In a preferred embodiment, the inventive wax contains 0.5 to 99.5% by weight, preferably 10 to 90% by weight, of a water-soluble ethylene oxide-proplene oxide adduct to a monohydric or polyhydric alcohol having 1 to 40 carbon atoms or to water.

In a further preferred embodiment, the inventive wax contains up to 30% by weight of alcohols which have 4 to 12 carbon atoms and 1, 2 or 3 OH groups.

The present invention further relates to a process for purifying gases from pollutants by adsorption by bringing the gases to be purified into contact with an agent or a wax having a composition as described above.

The pollutants are generally nicotine, combustion products of tobacco, ozone and formaldehyde. The gas from which the pollutants are removed is preferably air.

The wax present in the inventive agent preferably has a drop melting point between 50 and 120° C., in particular 50 to 70° C. Its density is preferably between 0.98 and 1.22 g/cm$^3$.

In a preferred embodiment, the wax present in the inventive agent contains 0.5 to 99.5% by weight, preferably 10 to 90% by weight, of an alkoxylated montan acid as alkoxylated compound. Preferably such montan acids have a hydrocarbon chain of 20 to 40 carbon atoms, in particular 24 to 34 carbon atoms. The alkoxylated montan acid preferably exhibits an acid number of 3 to 200, in particular 5 to 100 mg of KOH/g. It preferably exhibits a saponification value less than 50, in particular from 1 to 15 mg of KOH/g. The alkoxylated montan acid, in a preferred embodiment, comprises between 10 and 800, in particular between 50 and 200, alkylene oxide units.

In a further preferred embodiment, the wax present in the inventive agent contains from 0.5 to 99.5% by weight, preferably 10 to 90% by weight, of an alkoxylate of an unbranched or branched, monohydric or polyhydric alcohol having 20 to 40 carbon atoms, preferably 24 to 34 carbon atoms in chain length. Such alcohol alkoxylates preferably comprise 1 to 700 alkoxy units, in particular 90 to 450 alkoxy units.

In a further preferred embodiment, the wax present in the inventive agent contains 0.5 to 99.5% by weight, preferably 10 to 90% by weight, of a water-soluble ethylene oxide-propylene oxide adduct to a monohydric or polyhydric alcohol having 1 to 40, in particular 1 to 5 carbon atoms. Such ethylene oxide-propylene oxide adducts preferably contain between 1 and 600, in particular 1 to 40, units of ethylene oxide and 1 and 150, in particular 1 to 10, units of propylene oxide. The molar ratio between EO and PO is generally from EO:PO=1:1 to 4:1. The adduct can generally be prepared by polyaddition of ethylene oxide and propylene oxide to suitable alcohols. The adduct can be present as random copolymer or block copolymer. The preferred EO-PO adduct has a molar weight of 500–30 000, preferably 1 000 to 25 000 g/mol.

Examples of such preferred embodiments are ethylene oxide-propylene oxide adducts of the formula R—O—CH$_2$—CJ$_2$-O([CH$_3$]—C$_2$H$_4$—O)$_m$—(CH$_2$—CH$_2$R—O—[CH$_3$]—C$_2$H$_4$)$_m$—(CH$_2$—CH$_2$.O)$_k$—H, where R is C$_1$–C$_{40}$ alkyl, number from 1 to 150 and k is a number from 1 to 600.

Preferred alcohols for the alkoxylation are those having 1 to 4 OH groups, for example methanol, ethanol, propanol, butanol, glycerol or pentaerythritol.

Further preferred ethylene oxide-propylene oxide adducts are those which, instead of by polyaddition to an alcohol, can be prepared by polyaddition of ethylene oxide and propylene oxide to water. They generally correspond to the formula HO—([CH$_3$]—C$_2$H$_4$—O)$_m$—(CH$_2$—CH$_2$—O)$_k$—H, where they may be either random copolymers or block copolymers and m and k have the meanings specified above. The preferred EO-PO adduct has a molar weight of 500–30 000, preferably 1 000 to 25 000 g/mol.

If an alkoxylated alcohol which is alkoxylated with mixed alkoxy groups and an ethylene oxide-propylene oxide adduct are used simultaneously according to the invention, it is preferred that these are different substances.

The wax present in the inventive agent can, in addition to alkoxylated compounds, contain up to 30% by weight of alcohols which have 4 to 12 carbon atoms and 1, 2 or 3 OH groups.

The alcohol is soluble in water, acetone or other alcohols, for example isopropanol or ethanol. It is preferably dihydric or trihydric. Particularly preferred inventive alcohols are sugar alcohols, glycerol, pentaeryrithritol, mannitol, sorbitol or xylitol.

The term alkylene oxide here means ethylene oxide, propylene oxide or butylene oxide. Particularly preferably, it is ethylene oxide.

Preferably, the inventive agent is used on fibrous substrates (textiles, paper) or film substrates (plastics or metal).

Processing of the inventive agent to give products which can be used in gas purification technology is possible according to the following preferred processes 5.

1. Bed: the constituents of the alkoxylated wax are processed to form a homogeneous melt at approximately 100 to 150° C. with stirring. This melt is added dropwise to a steel belt by means of a granulating process, for example drop granulation, and thus processed to form pastilles having a diameter of 1–5 mm. Mechanical commutation using a cutter or impact mill to give the desired particle size is also possible.

2. Shaped part: the wax from method 1 is shaped to form a honeycomb body using an extruder or an injection-molding machine. Production of tubes having an open diameter of 1–10 mm which are combined to form bundled modules is also possible.

3. Coating: the inventive wax mixture from method 1 is applied as a melt or in dissolved form to a textile, film or paper substrate.

EXAMPLE 1

60 parts by weight of an ethoxylated C$_{28}$–C$_{32}$ montan acid containing 150 mol of EO, having a drop melting point of 60° C., an acid number of 5 mg of KOH/g and a saponification value of 12 mg of KOH/g were mixed homogeneously with 20 parts by weight of a pentaerythritol-started EO-PO adduct having a molecular weight of 4 000 g/mol and an EO:PO ratio of 4:1, and 10 parts by weight of sorbitol at 120° C. and then fashioned into pastilles of particle size 3–5 mm. The resulting granules were placed in a cylindrical shape having d=100 and l=200 mm bounded at the top and bottom by a screen mesh having 1 mm mesh width and closed. The cylinder shape was then incorporated into an air stream. The air was charged with a nicotine amount of 60 mg/m$^3$ and passed through the cylinder shape at 0.1 m/s. The nicotine content in the filtered air was 30 mg/m$^3$

EXAMPLE 2

60 parts by weight of an ethoxylated C$_{28}$–C$_{32}$ montan acid containing 140 mol of EO having a drop melting point of 60° C., an acid number of 5 mg of KOH/g and a saponification value of 10 mg of KOH/g were mixed homogeneously at 120° C. in a melt with 20 parts by weight of an EO adduct (polyethylene glycol) having a molecular weight of 10 000 g/mol (PEG 10 000) and after cooling were dissolved in water. The concentration of the solution was 60%. The solution was then, using a Foulard system applied to an air-permeable polyamide nonwoven of thickness 20 mm having a weight per unit area of 500 g/m$^2$. After the aqueous-coated substrate was dried, the coating of the nonwoven was 200 g/m$^2$. From the resultant nonwoven a conical adsorbent was produced which was then incorporated into a gas purification system with ventilation. As an air loading by tobacco smoke containing 20 mg/m$^3$ of nicotine and 10 mg/m$^3$ of formaldehyde and a flow rate of 0.1 m/s, 68% of said pollutants could be adsorbed. The adsorber was taken out after approximately 60 hours of service life, strongly discolored by tar constituents. During the entire operating life of the adsorber, a subjective improvement in air quality was observed.

EXAMPLE 3

40 parts by weight of an ethoxylated C$_{28}$–C$_{32}$ montan acid containing 130 mol of EO and having a drop melting point of 58° C., an acid number of 5 mg of KOH/g and a saponification value of 10 mg of KOH/g were mixed in a melt with 60 parts by weight of an EO adduct (polyethylene glycol) having a molar weight of 20 000 g/mol (PEG 20 000) and then extruded to form tubes of open diameter 3 mm and wall thickness 1 mm. The length of the individual tubes was 200 mm.

The tubes were combined to form a round module of 100 tubes and incorporated into a gas purification apparatus. The air polluted with 20 mg/m$^3$ of nicotine was then passed through the described arrangement at a velocity of 0.1 m/s. The measured nicotine concentration in the air at the outlet of the adsorber was 10 mg/m$^3$.

What is claimed is:

1. An agent for removing at least one pollutant from a gas comprising a wax which has a drop melting point between 40 and 150° C., a melt viscosity of 2 to 20 000 mPas, and a needle penetration of 1 to 50 and which contains at least one alkoxylated compound.

2. The agent as claimed in claim 1, wherein the at least one pollutant is selected from the group consisting of nicotine, tobacco, combustion products, ozone and formaldehyde.

3. The agent as claimed in claim 1, wherein the wax contains 0.5 to 99.5% by weight of an alkoxylated montan acid as the alkoxylated compound.

4. The agent as claimed in claim 1, wherein the wax contains 0.5 to 99.5% by weight of an alkoxylate of an unbranched or branched, monohydric or polyhydric alcohol having 20 to 40 carbon atoms.

5. The agent as claimed in claim 1, wherein the wax contains 0.5 to 99.5% by weight of the water-soluble ethylene oxide-propylene oxide adduct to a monohydric or polyhydric alcohol having 1 to 40 carbon atoms.

6. The agent as claimed in claim 1, wherein the wax contains up to 30% by weight of alcohols which have 4 to 12 carbon atoms and 1, 2 or 3 OH groups.

7. A process for purifying a gas from at least one pollutant by adsorption, comprising the step of bringing the gas to be purified into contact with an agent according to claim 1.

8. A gas purification system comprising an agent according to claim 1.

9. A wax which has a drop melting point between 40 and 150° C., a melt viscosity of 2 to 20 000 mPas and a needle penetration of 1 to 50 comprising:
   a) 0.5 to 99.5% by weight of an alkoxylated montan acid, and
   b) 0.5 to 99.5% by weight of an alkoxylate of an unbranched or branched, monohydric or polyhydric alcohol having 20 to 40 carbon atoms.

10. The wax as claimed in claim 9, further comprising 0.5 to 99.5% by weight of a water-soluble ethylene oxide-propylene oxide adduct to a monohydric or polyhydric alcohol having 1 to 40 carbon atoms, or to water.

11. The wax as claimed in claim 9, further comprising up to 30% by weight of alcohols which have 4 to 12 carbon atoms and 1, 2 or 3 OH groups.

12. A process for purifying a gas from at least one pollutant by adsorption, comprising the step of bringing the gas to be purified into contact with a wax according to claim 9.

13. A gas purification system comprising a wax according to claim 9.

* * * * *